United States Patent [19]

Ito et al.

[11] 4,380,015

[45] Apr. 12, 1983

[54] RECORDING SYSTEM FOR RECORDING INFORMATION ON RECORD MEDIUM BY USING ENERGY BEAM

[75] Inventors: Osamu Ito, Itami; Isao Watanabe, Takatsuki, both of Japan

[73] Assignee: Mitsubishi Denki Kabushiki Kaisha, Tokyo, Japan

[21] Appl. No.: 240,063

[22] Filed: Mar. 3, 1981

[30] Foreign Application Priority Data

Apr. 28, 1980 [JP] Japan ................................ 55-56526

[51] Int. Cl.³ ............................................ G01D 15/14
[52] U.S. Cl. ................................ 346/108; 346/76 L; 369/106; 369/116
[58] Field of Search .............. 346/108, 76 L; 369/106, 369/116; 358/342

[56] References Cited

U.S. PATENT DOCUMENTS 4,225,873 9/1980 Winslow ........................... 346/76 L
4,283,785 8/1981 Miyauchi ............................ 369/116

FOREIGN PATENT DOCUMENTS 28111 5/1981 European Pat. Off. ............ 369/106
53-9101 1/1978 Japan .................................. 369/106
55-25898 2/1980 Japan .

Primary Examiner—Joseph W. Hartary
Attorney, Agent, or Firm—Wenderoth, Lind & Ponack

[57] ABSTRACT

A recording light beam from an argon laser is modulated with an electrical recording signal and then recorded on a rotating disc-shaped record medium. Immediately after this recording, a recorded signal on the record medium is reproduced with a light beam from a helium-argon laser and converted into an electrical signal. Duty cycles of both signals are sensed by respective duty cycle sensors. A differential amplifier produces a differential signal between the sensed duty cycles and supplies it to an optical modulator arranged to control the output of the recording laser. The modulator controls the recording light beam to its optimum light level for recording in response to the differential signal which was detected just before its modulation.

6 Claims, 6 Drawing Figures

4,380,015

RECORDING SYSTEM FOR RECORDING INFORMATION ON RECORD MEDIUM BY USING ENERGY BEAM

BACKGROUND OF THE INVENTION

This invention relates to improvements in a recording system for recording information on a record medium by using an energy beam.

When a beam of light or the like is used to record and reproduce information on and from a record medium such as a tape or a disc, the phase information in a signal reproduced from the record medium must be made to coincide with the phase information in a recording signal. For example, when a frequency modulated video signal is recorded and reproduced on and from a record medium, a reproduced frequency modulated wave may have its symmetry destroyed although a corresponding recorded frequency modulated wave had good symmetry. Under these circumstances, a reproduced wave includes a second harmonic which, in turn, spectrally overlaps a side band of the fundamental wave. As a result, the FM demodulation causes, in addition to the video signal, beat interferences. Furthermore, upon the recording and reproducing of PCM digital signals, the digital demodulation thereof may be impossible if phase information is not well preserved between the recording and reproducing. Why the phase information is not well preserved between the recording and reproducing will now be described, by way of example, in conjunction with the recording of signals with a beam of light. Photosensitive materials used with such recording are generally difficult to develop a halftone thereon so that their portions which are sensitive to light can be, in many cases, definitely distinguished from their portions which are insensitive to light at some light level. Accordingly, when such a photosensitive material varies in its photosensitive level during a recording process, the same optical signal forms different record traces. For example, when the photosensitive material has its photosensitive level lying just on the average level of a waveform for the optical signal, the resulting record trace has a duty cycle of 50% and does not include a second harmonic. However, when the photosensitive level does not coincide with the average level of the waveform for the optical signal, the duty cycle of the resulting record trace is not of 50% and a second harmonic is caused, resulting in a reproduced signal which is deteriorated in its quality. In order to decrease the second harmonic of the reproduced signal, there has been previously proposed a method of strictly controlling the intensity of the light beam and the photosensitive level of the photosensitive material to constant magnitudes respectively. This method has been extremely difficult to be actually carried out because of changes in parameters concerning the light beam and photosensitive material.

Accordingly, it is an object of the present invention to provide a new and improved recording system for accurately preserving phase information upon recording, not only for frequency modulated signals but also for signals varied in their duty cycle, and for recording without the influences of both the instability of the source of the energy beam involved and the unevenness of the sensitivity of the record medium involved.

SUMMARY OF THE INVENTION

The present invention provides a recording system for recording information on a record medium by using an energy beam, comprising an input terminal which is supplied with an electrical recording signal, a source of an energy beam for generating an energy beam for recording information on a record medium, a modulator means for modulating said energy beam with said electrical recording signal, a recording means for recording information on the record medium with the modulated energy beam, a reproducing means for reproducing information recorded on said record medium substantially simultaneously with the recording of the information to produce a reproduced signal converted to the electrical signal, a first duty cycle sensor means connected to said reproducing means to sense a duty cycle of said reproduced signal from said reproducing means, a second duty cycle sensor means connected to the input terminal to sense a duty cycle of the recorded signal, a differential amplifier means connected to said first and second cycle sensor means to generate a difference between output signals from said first and second duty cycle sensor means to produce a differential signal, and a control means connected to said differential amplifier means to control the power of the energy beam entered into the modulation means from the source of the energy beam in response to the differential signal from the differential amplifier means.

In a preferred embodiment of the present invention, each of the first and second duty cycle sensor means may include a clamp circuit for clamping the lower end of a signal applied thereto to a null potential, a peak sensor circuit connected to the clamp circuit to sense the peak value of the clamped signal, an attenuator connected to the peak sensor circuit to halve the sensed peak value, a comparator connected to both the clamp circuit and the attenuator to produce a train of rectangular pulses, and a smoothing low pass filter connected to the comparator to smooth the rectangular pulses to provide the duty cycle of said signal.

BRIEF DESCRIPTION OF THE DRAWINGS

The present invention will become more readily apparent from the following detailed description taken in conjunction with the accompanying drawing in which.

DESCRIPTION OF THE PREFERRED EMBODIMENTS

Figure 1:
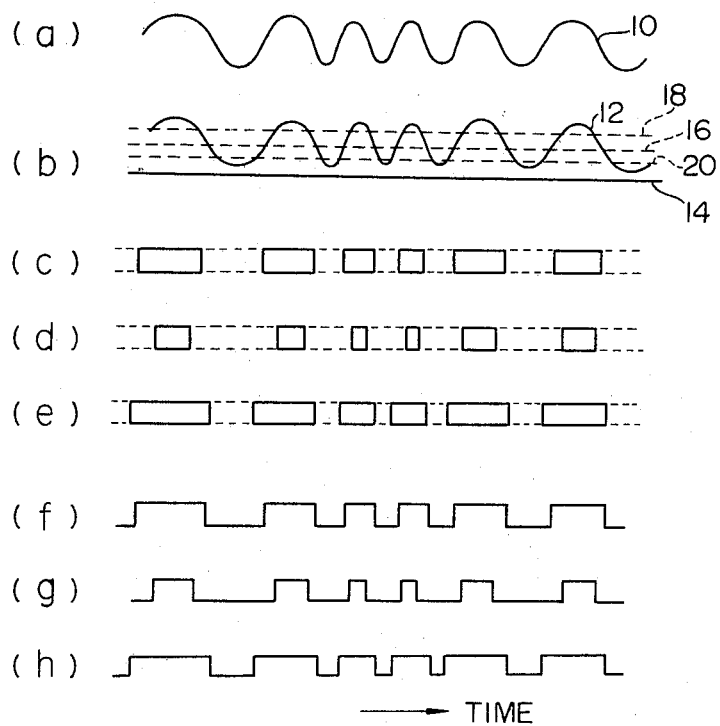
FIG. 1 is a graph illustrating waveforms useful in explaining the operation of a conventional recording system employing an energy beam.

For a better understanding of the nature of the present invention, the signal recording and reproducing using a beam of light will now be described in conjunction with causes for which the phase information are different between the recording and reproducing processes and with reference to FIG. 1 of the drawings wherein there are illustrated a waveform to be recorded, waveforms for signal recorded on record media having different photosensitivities and those for signals reproduced from such record media. In FIG. 1 a waveform (a) designates a recording signal 10 and a waveform (b) designates an optical signal 12 modulated with the recording signal 10 and having a zero level designated by solid horizontal line 14. When a beam of light is used to record a signal with a high density on a record medium the photosensitive material which is involved is generally difficult to develop with respect to halftones and their portions which are sensitive to light can be in many cases definitely distinguished from their portions which are insensitive to light by some light level. Dotted horizontal lines 16, 18 and 20 disposed above the solid horizontal line 14 designates relative photosensitive levels of the photosensitive material. It is assumed that the photosensitive level 16 lies at the mean level of the optical signal 12 or waveform (b) and the photosensitive levels 18 and 20 lie near the upper and lower peak values of the waveform (b) respectively.

When a photosensitive level changes during the recording process, the same optical signal results in different record traces. More specifically, the optical signal 12 has formed a record trace as shwon at waveform (c) in FIG. 1 on a record medium coated with a photosensitive material having a photosensitive level 16 and also record trace as shown at waveforms (d) and (e) in FIG. 1 on record media coated with photosensitive materials having photosensitive levels 18 and 20 respectively.

In FIG. 1, waveforms (f), (g) and (h) designate signals reproduced from the record traces as shown at waveforms waveforms (c), (d) and (e) respectively. When the recording has been effected on the record medium coated with the photosensitive material having the photosensitive level 16, the record trace as shown at waveform (c) has a duty cycle of 50% because the photosensitive level 16 is located just at the average level of the optical signal 12 or waveform (b). As a result, the waveform (f) reproduced from the waveform (c) has similarly a duty cycle of 50% and does not include a second harmonic. However, for the record medium coated with the photosensitive material having the photosensitive level 18 or 20, the resulting record trace has waveform (g) or (h) and the duty cycle thereof is not of 50% and a second harmonic is caused as will readily be understood from waveform (g) or (h) shown in FIG. 1. This has resulted in an objection in that the quality of the reproduced signal is deteriorated.

In order to prevent the reproduced signal from having waveform (g) or (h) as shown in FIG. 1 and to decrease the second harmonic of the reproduced signal, there has been already proposed one method of controlling strictly the intensity of the light beam and the photosensitive level of the photosensitive agent to constant magnitudes respectively. In this method, however, the intensity of the light beam has been apt to change due to secular change in an associated light source, a variation in a source voltage involved, the misalignment of a lens system involved and the defocussing thereof. Furthermore, the photosensitive level of the photosensitive material has been difficult to maintain constant owing to an uneven combination of photosensitive ingredients and an uneven coating of the record medium with the photosensitive material. Furthermore, for the recording on a disc-shaped record medium, the power density of the light beam becomes relatively large toward the inner radius of the disc. Therefore, it has been extremely difficult to actually carry out the above-mentioned method.

Japanese laid-open patent application No. 00910/1978 discloses a method of controlling automatically a power of a recording laser in which a duty cycle of a reproduced signal is sensed and the sensed duty cycle is maintained constant by controlling automatically the power of an associated recording laser. It has been found that the cited application is applicable to the recording of frequency modulated signals which are good in symmetry (or having the duty cycle of 50%) and signals having a constant duty cycle but not applicable to the recording of signals having a duty cycle which is not constant.

Figure 2:
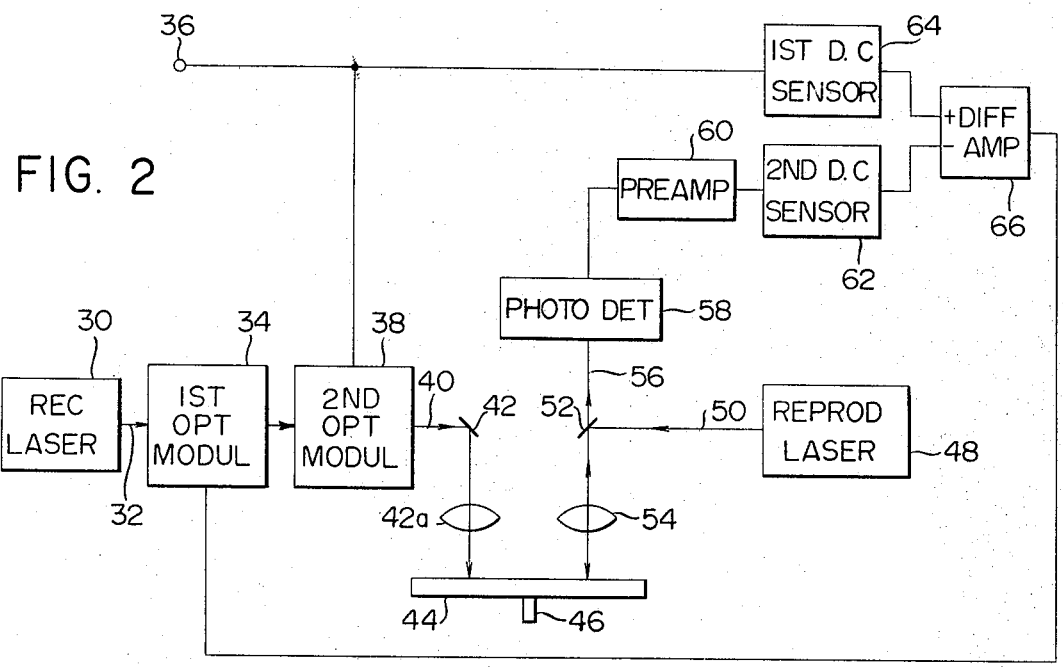
FIG. 2 is a block diagram of one embodiment according to the recording system of the present invention.

Referring now to FIG. 2, there is illustrated one embodiment according to the recording system of the present invention. The arrangement illustrated comprises a recording unit and a reproducing unit. The recording unit comprises a recording source of an energy beam 30, in this case, an argon laser for emitting a laser light beam 32, a first optical modulator 34 for receiving the beam of laser light 32, an input terminal 36 supplied with an electrical recording signal, and a second optical modulator 38 optically coupled to the first optical modulator 34 and connected to the input terminal 36 to produce an amplitude modulated recorded light beam 40. That light beam 40 is reflected from a recording reflecting mirror 42 and then passed through a recording focussing lens 42a to be focussed on a disc-shaped record medium 44 coated with any suitable photosensitive material (not shown) and rotated at a constant rotational speed about the longitudinal axis of the rotary shaft 46.

On the other hand, the reproducing unit comprises a reproducing source of energy beam 48 similar to the recording source. In the example illustrated, the reproducing source of energy beam 48 is a helium-argon laser emitting a reproducing beam of a laser light 50 almost all the which is reflected from a beam splitter 52 and focussed on the rotating record medium 44 by a reproducing focussing lens 54. The beam of laser light 50 focussed on the rotating record medum 44 is modulated with information recorded on the latter and reflected from the record medium 44 as a reproduced light beam 56.

That light beam 56 passes through the reproducing focussing lens 54 and the beam splitter 52 and reaches a photo-detector 58 where the beam is converted to a corresponding electrical signal. The photo-detector 58 is connected to a preamplifier 60 where the electrical signal is amplified. The preamplifier 60 is connected to a second duty cycle sensor 62 for sensing a duty cycle of the amplified signal from the preamplifier 60. The input terminal 36 is also connected to a first duty cycle sensor 64 for sensing a duty cycle of the recording signal applied thereto. The second and first duty cycle sensors 62 and 64 are respectively connected to a negative and a positive input of a differential amplifier 66 for producing the difference between the duty cycle of the recording signal and that of the reproduced light beam 56. The differential amplifier 66 has its output connected to the first optical modulator 34.

Figure 3:
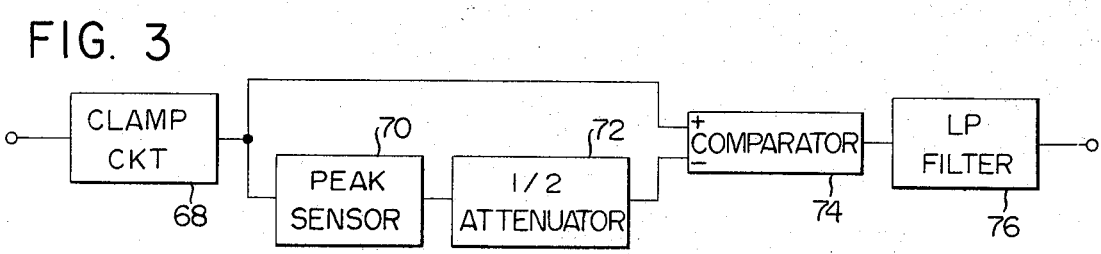
FIG. 3 is a block diagram of the details of the duty cycle detector shown in FIG. 2.

Each of the duty cycle sensors 62 and 64 may be constructed as shown in FIG. 3. The arrangement illustrated comprises a clamp circuit 68 for clamping the lower end of a signal to a null potential, a peak sensor 70 connected to the clamp circuit 68 to sense the peak value of the clamped signal, and a one-half attenuator 72. The one-half attenuator 72 is connected to a negative input of a comparator 74 which has a positive input connected to the clamp circuit 68. The comparator 74 is then connected to a smoothing low pass filter 76 which is subsequently connected to the first optical modulator 34 through differential amplifier 66 (not shown in FIG. 3).

Figure 4:
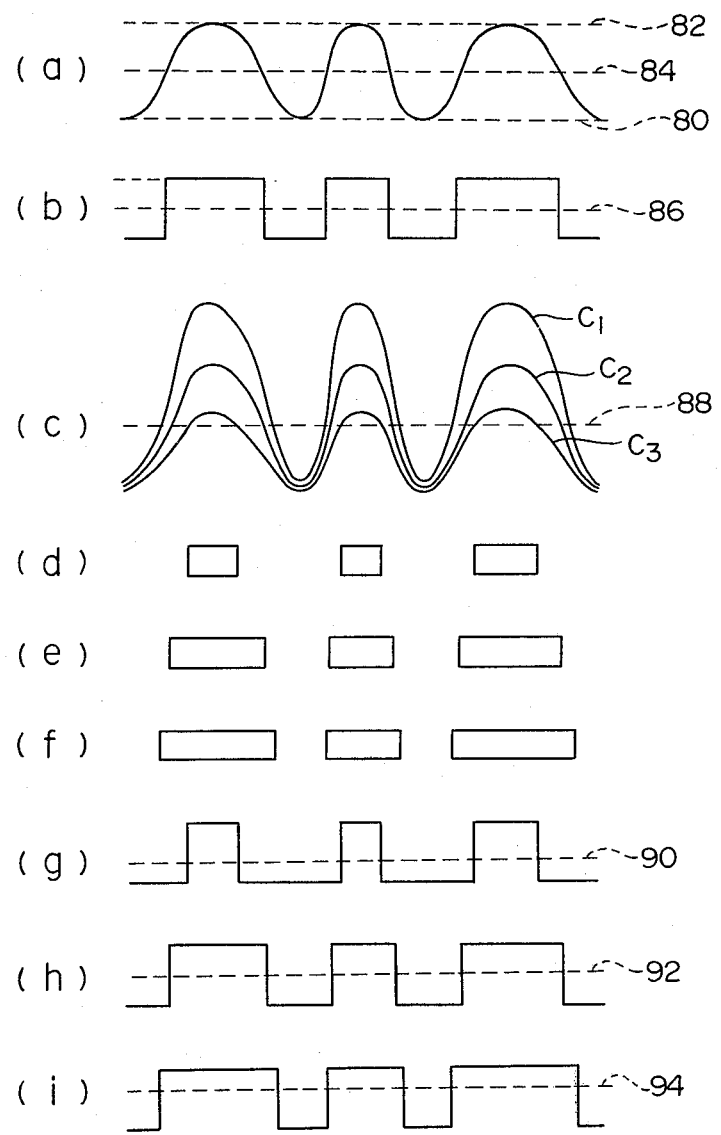
FIG. 4 is a graph illustrating waveforms developed at various points in the arrangements shown in FIGS. 2 and 3.

The operation of the arrangements shown in FIGS. 2 and 3 will now be described in conjunction with FIG. 4 wherein there are illustrated waveforms developed at various points in the arrangements. A recording signal applied to the input terminal 36 is of a waveform as shown in FIG. 4 (a) and is applied to the first duty cycle sensor 64 which, in turn, delivers to the differential amplifier 66 a signal or a voltage corresponding to the duty cycle of the recording signal sensed thereby. More specifically, the waveform of FIG. 4(a) is applied to the clamp circuit 68 where the lower end thereof is clamped to a null potential as shown by dotted line 80 in FIG. 4(a). The thus clamped waveform (a) is fed into the peak sensor 70 which senses the peak voltage thereof shown by dotted line 82 in FIG. 4(a). The one-half attenuator 72 decreases the peak voltage 82 to one-half thereof as shown by dotted line 84 in FIG. 4(a). The voltage 84 is compared with the waveform of FIG. 4(a) by the comparator 74 resulting in a train of rectangular pulses having two values, e.g.—a null voltage and a voltage V, as shown by the waveform shown in FIG. 4(b). From the comparison of the waveform of FIG. 4(a) with the waveform of FIG. 4(b) it can be seen that each of the rectangular pulses shifts from one to the other of the two voltages at an intersection of the voltage 84 and the waveform of FIG. 4(a). The rectangular pulses of the waveform of FIG. 4(b) pass through the low-pass filter 76 having a passband which has a cutoff frequency sufficiently less than the frequencies of the recording signal. Therefore, the low pass filter 76 provides the mean value of the rectangular pulses of the waveform of FIG. 4(b) as shown by dotted line 86 in FIG. 4(b). That mean value 86 provides a value corresponding to the duty cycle of the recording signal of a waveform as shown in FIG. 4(a).

The recording signal of the waveform of FIG. 4(a) is also applied to the second optical modulator 38 to modulate the beam of laser light 32 emmitted from the recording argon laser 30 after having passed through the first optical modulator 34. The first optical modulator 34 is operative to control the power of laser light beam 32 from the argon laser 30 as will be described whereinafter. FIG. 4(c) shows waveforms $(c_1)$, $(c_2)$ and $(c_3)$ having powers differently controlled by the first optical modulator 34 and modulated with the recording signal of the waveform of FIG. 4(a) by the second optical modulator 38. Waveforms $(c_1)$, $(c_2)$ and $(c_3)$ have an excessive, a proper and a deficient power for the recording respectively. Dotted line 88 depicts the photosensitive level of the record medium 44.

The modulated light beam from the second optical modulator 38 is reflected from the relfecting mirror 42 and focussed on the rotating record medium by the recording focussing lens 42a as described above. When the recording modulated light beam has waveform $(c_3)$, $(c_2)$ or $(c_1)$ respectively, it is recorded into a record trace on the record medium 44 as shown by the waveforms of FIG. 4(d), 4(e) or 4(f) respectively.

By arranging the reproducing optical system as described above to effect the reproducing from the record traces immediately after their recording, the reproducing from the record trace can be effected at the substantially same time as the recording thereof. It has been found that the reproducing can be effected with a time delay of less than scores of milliseconds relative to the corrosponding recording. The waveforms of FIGS. 4(g), and 4(h) and 4(i) describe signals reproduced from the record traces as shown by the waveforms of FIGS. 4(d), 4(e) and 4(f) respectively.

The reproduced signal 56 is applied to the photo-detector 58 where it is converted to a corresponding electrical signal. The converted electrical signal is amplified by the preamplifier 60 and then applied to the second duty cycle sensor 62 where the duty cycle thereof is sensed as described above in conjunction with FIG. 3. Dotted lines 90, 92 and 94, as shown in FIGS. 4(g), 4(h) and 4(i) respectively, indicate the means values obtained with the waveforms of FIGS. 4(g), 4(h) and 4(i) respectively and provide voltages corresponding to the duty cycles sensed by the second duty cycle sensor 62.

By designing and constructing the second and first duty ratio sensors 62 and 64 respectively so as to produce equal voltages with the same duty cycles, the differential amplifier 66 can produce a null differential voltage with the reproduced signal having its duty cycle equal to that of the recording signal.

It is now assumed that when the recording signal is of the waveform $(c_2)$, the voltage 92 corresponding to the duty cycle of the reproduced signal is equal to the voltage 86 corresponding to the duty cycle of the recording signal. The term "duty cycle" used hereinafter implies the voltage corresponding to the duty cycle of the signal.

If the recording signal has an excessive power as shown at waveform $(c_1)$ in FIG. 4(c) so that the reproduced signal has a larger duty cycle than that of the recording signal, then the differential amplifier 66 supplies a negative voltage to the first optical modulator 34. The first optical modulator 34 is designed and constructed so that it is responsive to a negative voltage applied thereto so as to decrease the quantity of light transmitted therethrough and responsive to a positive voltage applied thereto so as to increase the quanity of light transmitted therethrough. Under these circumstances, the first optical modulator 34 is operative to decrease the quantity of light transmitted therethrough in response to a negative voltage from the differential amplifier 66 with the result that the laser light beam leaving the first optical modulator 34 has the proper power for the recording. Thus, the modulated recording signal from the second optical modulator 38 is changed to approach waveform $(c_2)$ from waveform $(c_1)$.

On the contrary, if the modulated recording signal has a deficient power, as shown by waveform $(c_2)$, then the differential amplifier 66 delivers a positive voltage to the first optical modulator 34 because the reproduced signal has a smaller duty cycle than that of the recording signal. Under these circumstances, the first optical modulator 34 is operated to increase the quantity of light transmitted therethrough. As a result, the modulated recorded signal is changed to approach waveform $(c_2)$ from waveform $(c_3)$.

From the foregoing it is seen that the modulated recording signal from the second optical modulator is automatically adjusted to have waveform $(c_2)$ thus resulting in the proper recording.

Each of the second and first duty cycle sensors 62 or 64 includes the clamp circuit 68 to effect the DC reproduction and therefore senses the duty cycle more strictly.

Figure 5A:
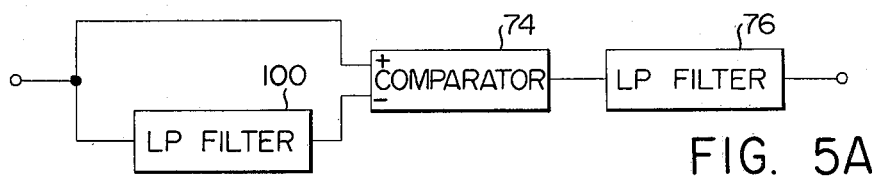
FIG. 5A is a block diagram of a modification of the duty cycle sensor shown in FIG. 2.
Figure 5B:
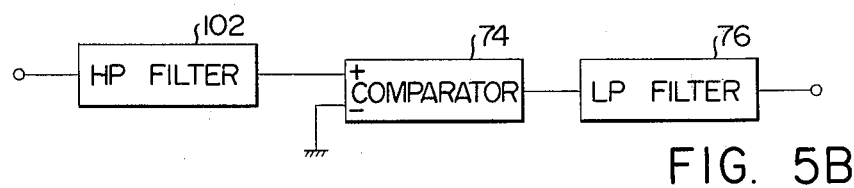
FIG. 5B is a block diagram of another modification of the duty cycle sensor shown in FIG. 2.

However, each of the duty cycle sensors may be simplified as shown in FIG. 5A or 5B to be satisfactorily put to practical use. In the arrangement illustrated in FIG. 5A, an input is applied directly to the positive input of the comparator 74 which is subsequently connected to the low pass filter 76. Therefore, the negative input to the comparator 74 has applied thereto the mean value of the input signal provided by the low pass filter 100.

In the arrangement illustrated in FIG. 5B the input signal is applied via a high pass filter 102 to the positive input to the comparator 74 having the negative input thereof connected to ground or a null potential. As in the arrangement of FIG. 3, the comparator 74 is connected to the low pass filter 76. The input signal passing through the high pass filter 102 has a null potential as its mean value and is applied to the positive input to the comparator 74.

The arrangement of FIG. 5A is quite identical in operation to that shown in FIG. 5B. That is, the input signal has a duty cycle estimated by the intersection of the input signal and the mean level thereof. It is noted that in FIGS. 5A and 5B, the input signal is applied to the comparator 74 after its low frequency components including its DC components have been removed by the filter and therefore, the two arrangements do not sense the duty cycle in the strict sense. However, when the arrangement shown in FIGS. 5A or 5B forms each of the first and second duty cycle sensors 64 or 62, a sensing error occurring in one of the sensors offsets that occurring in the other sensor, resulting in no hindrance for practical purposes.

From the foregoing, it can be seen that the present invention provides a recording system ensuring that phase information can be well preserved upon the recording of not only frequency modulated signals, but also of signals having a variable cycle, without the influences of both the instability of the source of the energy beam involved and the variations in the photosensitivity of the record medium used.

While the present invention has been illustrated and described in conjunction with a few preferred embodiments thereof, it is to be understood that numerous changes and modifications may be restored to without departing from the spirit and scope of the present invention. For example, the optical system used with the present invention may be simplified be substituting a single focussing lens for the recording and reproducing focussing lenses 42a and 54. In order to control the power of the light beam from the recording argon laser, the first optical modulator 34 may be replaced by control means disposed in a power supply for the argon laser and controlled by the differential amplifier 66. While the present invention has been described in conjunction with the recording on a photosensitive material by using a light beam from the argon laser it is to be understood that the same is equally applicable to light sources other than a laser and to electron beams. Furthermore, the present invention is equally applicable to the recording on record media by having physical changes such as deformation, vaporization, boring, electrification or the like caused thereon with a light beam or an electron beam. In addition it is to be understood that the present invention is not restricted by or to a disc-shaped record medium.

What is claimed is:

1. A recording system for recording information on a record medium by using an energy beam, comprising an input terminal which is supplied with an electrical recording signal, a recording source of an energy beam for generating an energy beam for recording information on said record medium, a modulator means for modulating said energy beam with said electrical recording signal, a recording means for recording said information on said record medium with said modulated energy beam, a reproducing means for reproducing information recorded on said record medium substantially simultaneously with the recording of said information to produce a reproduced signal converted to an electrical signal, a first duty cycle sensor means connected to said reproducing means to sense a duty cycle of said reproduced signal from said reproducing means, a second duty cycle sensor means connected to said input terminal to sense a duty cycle of said recording signal, a differential amplifier means connected to said first and second duty cycle sensor means to generate a difference between output signals from said first and second duty cycle sensor means to produce a differential signal, and a control means connected to said differential amplifier means to control the power of said energy beam entered into said modulator means from said source of said energy beam in response to said differential signal from said differential amplifier means.

2. A recording system as claimed in claim 1, wherein said control means comprises another modulator means disposed between said source of said energy beam and said modulator means.

3. A recording system as claimed in claim 1, wherein said control means is disposed in a power supply for said recording source of said energy beam.

4. A recording system as claimed in claim 1, wherein each of said first and second duty cycle sensor means includes a clamp circuit for clamping the lower end of a signal applied thereto to a null potential, a peak sensor circuit connected to said clamp circuit to sense the peak value of said clamped signal, an attenuator connected to said peak sensor circuit to halve said sensed peak value, a comparator connected to both said clamp circuit and said attenuator to produce a train of rectangular pulses, and a smoothing low pass filter connected to said comparator to smooth said rectangular pulses so as to provide a duty cycle of said signal applied thereto.

5. A recording system as claimed in claim 1, wherein each of said first and second duty cycle means includes a low pass filter supplied with an input signal, a comparator having a pair of inputs one of which is supplied with said input signal and the other of which is supplied with an output signal from said low pass filter, and a low pass filter connected to said comparator to smooth an output from said comparator so as to provide a duty cycle of said input signal.

6. A recording system as claimed in claim 1, wherein each of said first and second duty cycle sensor means includes a high pass filter supplied with an input signal, a comparator having one input connected to said high pass filter and the other input connected to a null potential, and a low pass filter connected to said comparator to smooth an output from said comparator so as to provide a duty cycle of said input signal.

* * * * *